US010901724B2

(12) United States Patent
Ishiguro et al.

(10) Patent No.: US 10,901,724 B2
(45) Date of Patent: Jan. 26, 2021

(54) SOFTWARE UPDATE SYSTEM FOR MOBILE BODY USING VEHICLE-MOUNTED GATEWAY APPARATUS (71) Applicants: KABUSHIKI KAISHA TOSHIBA, Minato-ku (JP); TOSHIBA DIGITAL SOLUTIONS CORPORATION, Kawasaki (JP)

(72) Inventors: Yuutarou Ishiguro, Suginami (JP); Shion Itou, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 24 days.

(21) Appl. No.: 16/342,063

(22) PCT Filed: Oct. 28, 2016

(86) PCT No.: PCT/JP2016/082092
§ 371 (c)(1),
(2) Date: Apr. 15, 2019

(87) PCT Pub. No.: WO2018/078805
PCT Pub. Date: May 3, 2018

(65) Prior Publication Data
US 2019/0235857 A1 Aug. 1, 2019

(51) Int. Cl.
G06F 9/44 (2018.01)
G06F 8/65 (2018.01)
(Continued)

(52) U.S. Cl.
CPC .............. G06F 8/65 (2013.01); B60R 16/023 (2013.01); G06F 11/00 (2013.01); G06F 21/57 (2013.01); H04L 67/34 (2013.01)

(58) Field of Classification Search
CPC .............. G06F 8/65; G06F 11/00; G06F 21/57
See application file for complete search history.

(56) References Cited

U.S. PATENT DOCUMENTS

2006/0224699 A1* 10/2006 Kruse ................. H04L 67/2819
709/219
2007/0100513 A1* 5/2007 Asano ................. G08G 1/0104
701/2

(Continued)

FOREIGN PATENT DOCUMENTS

JP       11-239126 A      8/1999
JP    2004-254120 A       9/2004
(Continued)

OTHER PUBLICATIONS

International Search Report dated Jan. 24, 2017 in PCT/JP2016/082092 filed Oct. 28, 2016.

Primary Examiner — Hang Pan
(74) Attorney, Agent, or Firm — Oblon, McClelland, Maier & Neustadt, L.L.P.

(57) ABSTRACT

A software update system updating software executed on a predetermined system for controlling a mobile body and including a vehicle-mounted gateway (GW) apparatus within the mobile body and connected to the predetermined system, and a software (SW) update apparatus connected to the vehicle-mounted gateway apparatus through a network. The SW update apparatus delivers software to the vehicle-mounted GW apparatus, receives reception OK or reception NG of the software from the vehicle-mounted GW apparatus, and records the reception OK or the reception NG in the delivery-side log information. The vehicle-mounted GW apparatus records reception OK or reception NG of the software in the mobile body-side log information associated with the delivery-side log information, and transmits the reception result to the SW update apparatus. The vehicle- (Continued)

mounted GW apparatus permits update of the software on the predetermined system when the software reception history in the mobile body-side log information indicates reception OK.

5 Claims, 7 Drawing Sheets

(51) Int. Cl.
  *H04L 29/08* (2006.01)
  *B60R 16/023* (2006.01)
  *G06F 11/00* (2006.01)
  *G06F 21/57* (2013.01)

(56) References Cited

U.S. PATENT DOCUMENTS

| | | | |
|---|---|---|---|
| 2009/0064135 A1* | 3/2009 | Jimmerson | G06F 8/61 |
| | | | 717/178 |
| 2009/0125531 A1* | 5/2009 | Scheerer | G06Q 10/02 |
| 2013/0073116 A1 | 3/2013 | Abe et al. | |
| 2015/0242198 A1 | 8/2015 | Tobolski et al. | |

FOREIGN PATENT DOCUMENTS

| | | |
|---|---|---|
| JP | 2006-500827 A | 1/2006 |
| JP | 2013-69005 A | 4/2013 |
| WO | WO 2004/028112 A1 | 4/2004 |
| WO | WO 2016/158547 A1 | 10/2016 |

\* cited by examiner

SOFTWARE UPDATE SYSTEM FOR MOBILE BODY USING VEHICLE-MOUNTED GATEWAY APPARATUS

TECHNICAL FIELD

An embodiment of the present invention relates to a technique for updating software executed on a mobile body such as a vehicle through a vehicle-mounted gateway apparatus provided within the mobile body.

BACKGROUND ART

Vehicles are controlled entirely by vehicle control systems, for example. The vehicle control system controls the vehicle by executing a plurality of control programs. Software used in the vehicle control system (including the control programs and data for use in execution of the control programs) may be updated as appropriate (specifically, a modification program and/or a new program is installed). The update of such software can be performed with the aid of data communication over a network or in a dealer or a factory.

PRIOR ART DOCUMENTS

Patent Documents

[Patent Document 1] Japanese Patent Laid-Open No. 2004-254120
[Patent Document 2] Japanese Patent Laid-Open No. 1999-239126
[Patent Document 3] WO2004028112

DISCLOSURE OF THE INVENTION

Problems to be Solved by the Invention

It is an object of the present invention to provide a system for updating software executed on a mobile body through a vehicle-mounted gateway apparatus provided within the mobile body.

Means for Solving the Problems

A software update system according to an embodiment of the present invention is a system for updating software executed on a predetermined system for controlling a mobile body and includes a vehicle-mounted gateway apparatus provided within the mobile body and connected to the predetermined system, and a software update apparatus connected to the vehicle-mounted gateway apparatus through a network. The software update apparatus includes a first storage section storing delivery-side log information related to software to be delivered to the vehicle-mounted gateway apparatus, and a software update control section configured to perform delivery control for delivering the software to the vehicle-mounted gateway apparatus, to receive reception OK or reception NG of the software from the vehicle-mounted gateway apparatus, and to record the reception OK or the reception NG in the delivery-side log information. The vehicle-mounted gateway apparatus includes a second storage section storing mobile body-side log information associated with the delivery-side log information, the reception OK or the reception NG of the software delivered from the software update apparatus being recorded in the mobile body-side log information, and a software update management section configured to record the reception OK or the reception NG in the mobile body-side log information based on a reception result of the software and to transmit the reception OK or the reception NG on the side of the mobile body to the software update apparatus. The software update management section is configured to refer to the mobile body-side log information and to permit update of the software on the predetermined system when a reception history of the software indicates the reception OK.

MODE FOR CARRYING OUT THE INVENTION

An embodiment of the present invention will be described in the following with reference to the accompanying drawings.

Embodiment 1

Figure 1:
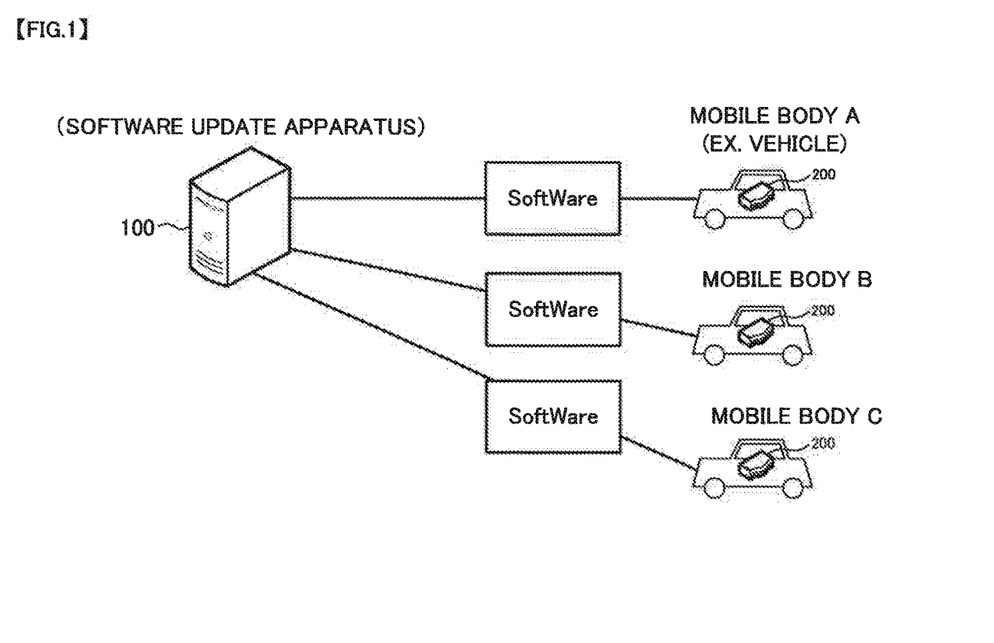
FIG. 1 A schematic diagram of a software update system according to Embodiment 1 of the present invention.

FIG. 1 is a schematic diagram showing a software update system according to Embodiment 1 of the present invention. The software update system according to Embodiment 1 is a system for updating software which is executed on a mobile body or used for controlling the mobile body. While Embodiment 1 is described by using a vehicle as an example of the mobile body, the present invention is applicable to other mobile bodies (such as a train, a robot or an air vehicle controlled automatically or remotely through wireless operation).

A vehicle-mounted gateway apparatus 200 (hereinafter referred to as a vehicle-mounted GW apparatus) is provided for the mobile body and is connected to a software update apparatus 100 over a predetermined network. The software update apparatus 100 delivers software composed of a single or a plurality of program modules to each of a plurality of mobile bodies. The mobile body receives the software delivered from the software update apparatus 100 through the vehicle-mounted GW apparatus 200 and updates software executed on the mobile body or software used for control of the mobile body.

The software delivered to the mobile body can include not only the program modules of control programs but also parameters, various types of data, and procedures for controlling execution of each program module, for example.

Figure 2:
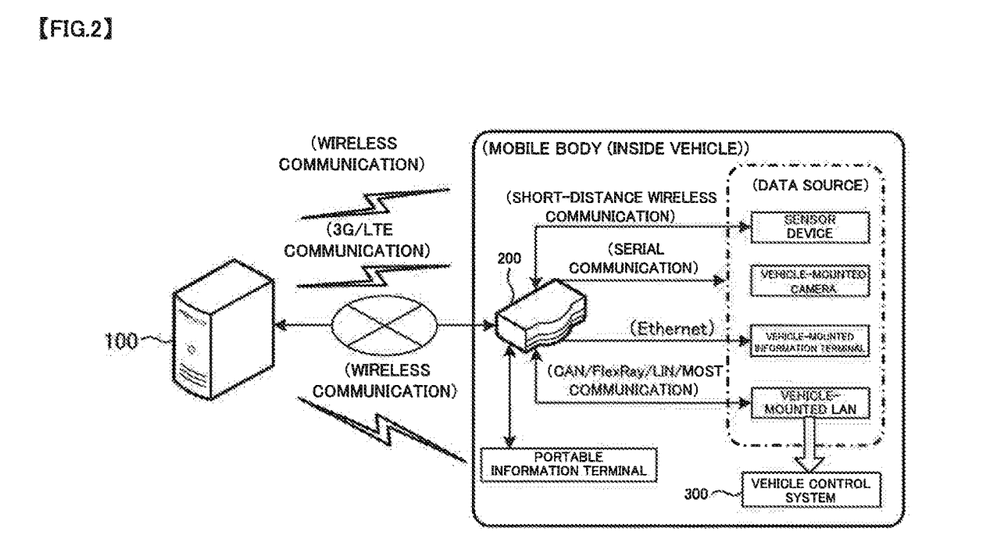
FIG. 2 A diagram showing the configuration of networks inside and outside a vehicle to which a vehicle-mounted gateway apparatus according to Embodiment 1 is applied.

FIG. 2 is a diagram showing the configuration of networks inside and outside the mobile body to which the vehicle-mounted GW apparatus 200 is applied. In Embodiment 1, the vehicle-mounted GW apparatus 200 provided within the mobile body controls the update of the software delivered from the software update apparatus 100 (including control of software reception and control of software update operation).

<Vehicle-Mounted GW Apparatus 200>

First, the vehicle-mounted GW apparatus 200 is described. The vehicle-mounted GW apparatus 200 is a vehicle-mounted device which is directly connected to a data source inside the vehicle and/or connected to a vehicle-mounted network connected to the data source. The vehicle-mounted GW apparatus 200 is configured as a network node which can connect to a vehicle exterior network to provide relay between inside and outside the vehicle. The vehicle-mounted GW apparatus 200 includes communication interfaces for wireless communication compliant with wireless LAN standards such as Wi-Fi via access points or for mobile phone communication compliant with 3G or LTE (Long Term Evolution) via base stations. The vehicle-mounted GW apparatus 200 can connect to the vehicle exterior network through a plurality of communication channels (with external communication schemes).

The vehicle exterior network is an IP (Internet Protocol) network, for example. The vehicle-mounted GW apparatus 200 can connect to the software update apparatus 100 over the IP network. The vehicle-mounted GW apparatus 200 can perform data communication with the software update apparatus 100 and transmit a mobile body-side log file (including information to be written to the log file), later described, to the software update apparatus 100. The vehicle-mounted GW apparatus 200 can also perform data communication with an external service system other than the software update apparatus 100 or transmit various types of data acquired from the data source inside the vehicle to the software update apparatus 100 or a predetermined external service system.

As shown in FIG. 2, the vehicle-mounted GW apparatus 200 can also connect to the vehicle exterior network via a portable information terminal including a communication interface compliant with Wi-Fi or 3G/LTE. The vehicle-mounted GW apparatus 200 can connect to the portable information terminal through USB (Universal Serial Bus) connection, wireless communication, and short-distance communication based on standards such as Bluetooth® and NFC (Near Field Communication). The portable information terminal is a mobile device having communication functions such as a multifunctional mobile phone such as a smartphone, a mobile phone, or a tablet terminal.

The vehicle-mounted GW apparatus 200 can connect to the data source inside the vehicle directly or through an existing vehicle-mounted network. The data source includes, for example, a sensor device such as a microphone (sound collecting apparatus), a human sensor, or a vital sensor wearable by a user, a vehicle-mounted camera such as a driving recorder equipped with a camera (imaging apparatus) or an in-car camera for imaging the interior of the vehicle, a vehicle-mounted information terminal such as a navigation system including display means such as a liquid crystal display, and a vehicle-mounted LAN. The vehicle-mounted LAN connects to a vehicle control system 300 or an audio device for multimedia which can serve as data sources.

The vehicle-mounted GW apparatus 200 performs data communication in accordance with a different communication scheme supported by each data source or the associated vehicle-mounted network. For example, the sensor device performs data communication through short-distance wireless communication. The vehicle-mounted camera performs data communication through serial (UART) communication (RS232C, RS422, RS485) over cable connection to the vehicle-mounted GW apparatus 200. The vehicle-mounted information terminal performs data communication through Ethernet communication over LAN cable connection.

The vehicle-mounted LAN comprises at least one vehicle-mounted network of a communication scheme such as CAN (Controller Area Network), FlexRay, LIN, or MOST (Media Oriented Systems Transport). The vehicle-mounted GW apparatus 200 connects to the single or plurality of the vehicle-mounted networks constituting the vehicle-mounted LAN to perform data communication according to the associated communication scheme.

Figure 3:
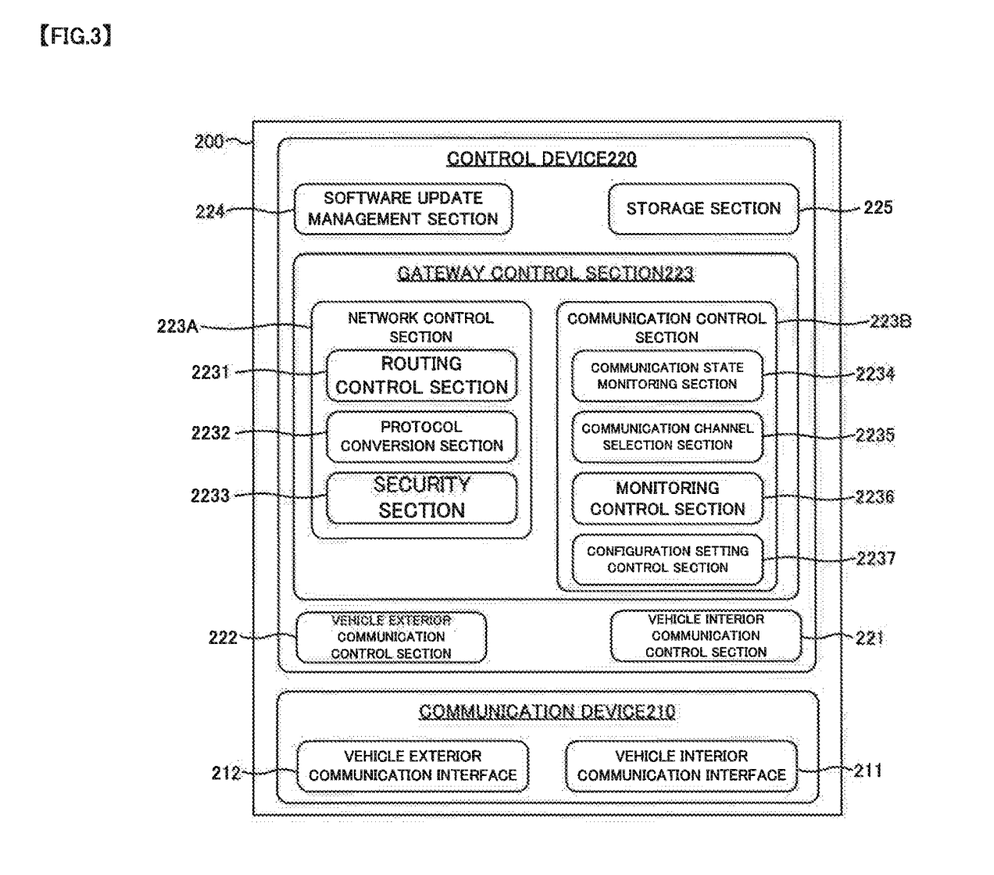
FIG. 3 A block diagram showing the components of the vehicle-mounted gateway apparatus according to Embodiment 1.

FIG. 3 is a block diagram showing the components of the vehicle-mounted GW apparatus 200. The vehicle-mounted GW apparatus 200 includes, as its hardware configuration, a communication device 210 for providing a communication interface with each data source or with the portable information terminal, and a control device 220 for performing overall control of the vehicle-mounted GW apparatus 200.

The communication device 210 includes a vehicle interior communication (internal communication) interface 211 for Ethernet, CAN, UART, USB, or short-distance wireless communication, and a vehicle exterior communication (external communication) interface 212 for wireless communication or mobile phone communication. The vehicle interior communication interface 211 can include a function of wireless communication with the portable information terminal or a connection interface such as a USB interface.

The control device 220 is configured to include functional components operative principally by software. First of all, the control device 220 can control each of the data sources. For example, the control device 220 can perform sensor control of the sensor device (including operation or data detection), imaging control of the vehicle-mounted camera (including video output control), and terminal control of the vehicle-mounted information terminal.

Thus, the control device 220 can output data received from the vehicle exterior network to each data source or can control each data source based on the received data. The control device 220 can also control one or both of two data sources in operation performed between those data sources. For example, the control device 220 can perform control to display detected data acquired by the sensor device or video taken by the vehicle-mounted camera on the display of the vehicle-mounted information terminal.

The control device 220 according to Embodiment 1 includes a vehicle interior communication control section 221, a vehicle exterior communication control section 222, a gateway control section (GW control section) 223, a software update management section 224, and a storage section 225.

The vehicle-mounted GW apparatus 200 has a device driver installed therein for each of wireless communication, mobile phone communication, UART, USB, short-distance wireless communication and the like. The vehicle interior communication control section 221 and the vehicle exterior communication control section 222 control communication through the vehicle interior communication interface 211 and the vehicle exterior communication interface 212 using each device driver. The vehicle interior communication control section 221 can also control communication with the vehicle-mounted LAN (vehicle control system 300), for example, without interposing any device driver.

The vehicle exterior communication control section 222 can perform registration of access points for wireless communication via Wi-Fi and the like. For example, the vehicle exterior communication control section 222 can detect and register access points at different locations as the vehicle physically moves.

The GW control section 223 is configured to include a network control section 223A and a communication control section 223B. The network control section 223A includes a routing control section 2231, a protocol conversion section 2232, and a security section 2233. The routing control section 2231 performs routing control in transmitting data collected from each data source (including the vehicle control system 300 via the vehicle-mounted LAN) to the vehicle exterior network and routing control in transmitting data received from the vehicle exterior network to each data source. The routing control section 2231 also performs routing control in data communication between the data sources within the vehicle interior network.

The protocol conversion section 2232 performs protocol conversion between different communication schemes associated with the data sources. The different communication schemes for the respective data sources can be previously held in the form of a protocol conversion table. The protocol conversion section 2232 performs protocol conversion, for example in transmitting data received from the vehicle exterior network to the data source.

The security section 2232 performs communication setting and communication processing for SSL (Secure Sockets Layer)/TLS (Transport Layer Security) protocol. SSL/TLS communication can be set for each data source. The security section 2232 can check whether the SSL/TLS should be set and can perform encryption in transmitting data from the vehicle interior network to the vehicle exterior network.

The communication control section 223B includes a communication state monitoring section 2234, a communication channel selection section 2235, a monitoring control section 2236, and a Configuration setting control section 2237. The communication control section 223B performs communication channel selection control, data monitoring control, and data transmission control for transmitting data collected from the data source to the vehicle exterior network based on Configuration setting information.

The communication channel selection section 2235 can perform communication channel selection control based on communication connection Configuration setting information. The communication connection Configuration setting information includes information for communication channel setting in data reception from the vehicle exterior network to the vehicle interior network and for communication channel setting in data transmission from the vehicle interior network to the vehicle exterior network.

The vehicle-mounted GW apparatus 200 according to Embodiment 1 is mounted in a mobile body such as a vehicle. Thus, for example, the vehicle-mounted GW apparatus 200 is assigned a dynamic IP address to serve as a network node. In data transmission and reception, the vehicle-mounted GW apparatus 200 actively accesses the software update apparatus 100 over the vehicle exterior network to establish connection.

The setting details for communication connection include automatic setting and/or priority setting. The vehicle-mounted GW apparatus 200 can connect to the vehicle exterior network over channels associated with a plurality of communication schemes. For example, the vehicle-mounted GW apparatus 200 can select one of three channels associated with Wi-Fi, portable information terminal, and 3G/LTE, or can set the degrees of priority for the three channels. For "automatic setting," the degrees of priority can be preset as desired. For example, Wi-Fi has the highest priority, portable information terminal is the next, and then 3G/LTE.

The setting details for communication connection can also be set differently for different types of received data. For example, the vehicle-mounted GW apparatus 200 can set different degrees of priority for communication channels between software delivered from the software update apparatus 100 and data delivered from any other system, or can set different degrees of priority for communication channels depending on the data capacity of software delivered from the software update apparatus 100.

This also applies to the communication connection in data transmission from the vehicle interior network to the vehicle exterior network. For example, the vehicle-mounted GW apparatus 200 can perform automatic setting and/or priority setting on communication channels for uploading vehicle information acquired from the vehicle control system 300 or communication channels for updating video or image taken by the vehicle-mounted camera.

The communication connection Configuration setting also includes specification (registration) of the URL of the software update apparatus 100 which serves as the connection point of the vehicle exterior network. A plurality of software update apparatuses 100 can be provided at a plurality of locations. In this case, each of the URLs of the software update apparatuses 100 at those locations can be registered. This also applies to any external service system.

The communication connection Configuration setting also includes valid/invalid setting of each of the plurality of communication channels used by the vehicle-mounted GW apparatus 200. Valid (ON)/invalid (OFF) can be set for Wi-Fi communication usage, 3G/LTE communication usage, and portable information terminal communication usage.

After start-up, the vehicle-mounted GW apparatus 200 (communication control section 223B) acquires the communication connection Configuration setting information and performs communication connection processing on a communication channel having its connection flag ON. The connection flag indicates valid (ON)/invalid (OFF) in communication usage setting of each communication scheme. When a plurality of communication channels have their connection flags ON, control is performed such that all the plurality of communication channels maintain their communication connections. Specifically, all the plurality of communication channels having their connection flags ON are controlled to maintain the connecting states continuously regardless of monitoring control or data collection and transmission control in the vehicle-mounted GW apparatus 200. For each data source, an appropriate communication channel is selected based on the Configuration setting depending on the communication state of each communication channel, and data communication with the vehicle exterior network is performed.

The communication state monitoring section 2234 monitors the communication state (connected/disconnected) of each communication channel having its connection flag ON. The communication state monitoring section 2234 outputs the communication state of each communication channel to the communication control section 223B. Then, the communication state monitoring section 2234 checks the presence or absence of a connection state monitoring completion signal (for example, an OFF signal of an ignition switch of the vehicle). When the monitoring should not be completed, and it is determined that the communication channel having its connection flag ON is not disconnected, the communication control section 223B continues the monitoring of the communication state. Alternatively, when it is determined that the communication channel is disconnected, the communication control section 223B again performs the communication connection processing on the disconnected communication channel having its connection flag ON. When the connection state monitoring completion signal is input and thus the monitoring should be completed, the communication control section 223B performs disconnection processing on any communication channel in connection.

The monitoring control section 2236 can monitor data output from each data source and also can set the Configuration setting information for use in the monitoring control section 2236. For example, vehicle-mounted LAN Configuration setting information includes setting information related to period of upload of vehicle information acquired from the vehicle control system 300 to the vehicle exterior network (external system), average vehicle speed threshold value, driving time threshold value and the like. For example, the sensor device can measure and/or calculate the heart rate, pulse interval, and blood pressure of a user and output them to the vehicle-mounted GW apparatus 200. Sensor device Configuration setting information includes setting information related to vital information transfer (upload) period, hart rate transfer threshold value, and heart rate abnormality threshold value.

The monitoring control section 2236 performs monitoring control based on the Configuration setting information set for each data source, for example. The data source can output continuous data in time series to the vehicle-mounted GW apparatus 200. The monitoring control based on the Configuration setting information includes abnormality detection control in which data collected from the data source is monitored, and occurrence of abnormality is sensed, for example when data exceeding a threshold value is detected, and data collection and transmission control in which the data collected from the data source is transmitted to the vehicle exterior network.

The monitoring control section 2236 can perform, for each data source, abnormality detection of the data output from the data source. When abnormality is detected, the monitoring control section 2236 can perform notification processing of displaying the fact that the abnormality is detected on the vehicle-mounted information terminal, for example.

Similarly to the communication state monitoring, the monitoring control can be performed based on checking of the presence or absence of a signal for completing monitoring control of each data source such as the OFF signal of the ignition switch of the vehicle.

The Configuration setting information described above can be set previously by the external service system or can be set by a user connecting to the external service system. The vehicle-mounted GW apparatus 200 can start up, for example by receiving power supply from a battery of the vehicle in response to turn-on/turn-off of the ignition switch of the vehicle. The vehicle-mounted GW apparatus 200 can connect to the external service system upon start-up to acquire the Configuration setting information. Then, the vehicle-mounted GW apparatus 200 performs communication channel selection processing based on the communication connection Configuration setting information.

The Configuration setting control section 2237 sets (updates) the Configuration setting information input to the control device 220 from the external service system in the storage section 225 such that the Configuration setting information is available to the communication channel selection section 2235 and the monitoring control section 2236.

The data communication between the vehicle-mounted GW apparatus 200 and the software update apparatus 100 can be validated by both of them using a preset identification ID of the user and an individual identifier (for example, a MAC address) of the vehicle GW apparatus 200. The vehicle-mounted GW apparatus 200 performs control such that the individual identifier is included in the data communication with the software update apparatus 100.

The storage section 225 stores various types of data to be processed in the control device 220 including the software update management section 224, information for use in each processing, data or information received from the vehicle exterior network, and the like. While the storage section 225 is contained in the vehicle-mounted GW apparatus 200 in the example of FIG. 3, the storage section 225 may be externally attached to the vehicle-mounted GW apparatus 200, for example.

<Software Update Through Vehicle-Mounted GW Apparatus 200>

In Embodiment 1, the vehicle-mounted GW apparatus 200 connects to the vehicle control system 300 through the vehicle-mounted LAN, and receives, from the software update apparatus 100, software to be executed on a control apparatus such as a vehicle ECU forming the vehicle control system 300. The software update apparatus 100 can deliver not only software for updating existing software in the mobile body but also new software to be executed on the mobile body. The software update apparatus 100 can be regarded as a management power apparatus for managing delivery of software to be executed on the mobile body and used for control of the mobile body.

Figure 4:
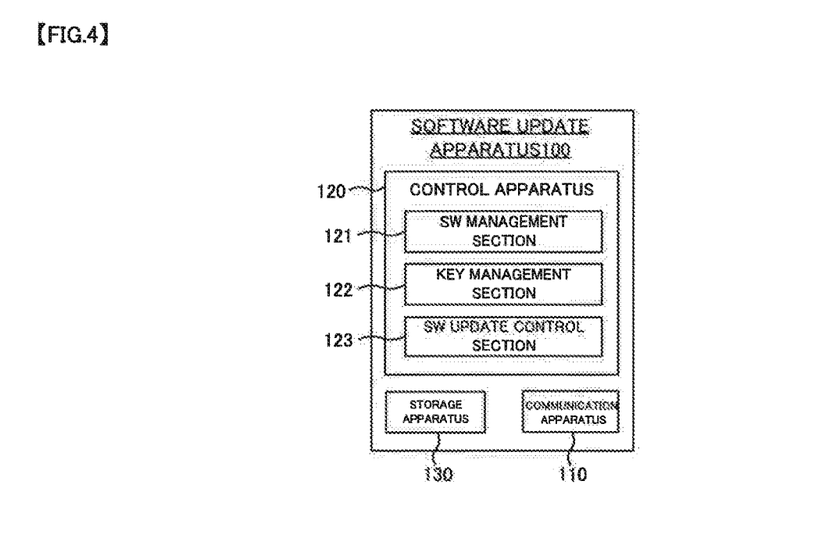
FIG. 4 A block diagram showing the components of a software update apparatus according to Embodiment 1.

FIG. 4 is a block diagram showing the components of the software update apparatus 100 according to Embodiment 1. The software update apparatus 100 is configured to include a communication apparatus 110, a control apparatus 120, and a storage apparatus 130.

The communication apparatus 110 controls data communication and connection with the vehicle-mounted GW apparatus 200 on the mobile body. The communication apparatus 110 can perform wireless communication compliant with wireless LAN standards such as Wi-Fi via access points or mobile phone communication compliant with 3G or LTE (Long Term Evolution) via base stations. The software update apparatus 100 can connect to the vehicle-mounted GW apparatus 200 on the mobile body through a plurality of communication channels and can deliver update software over an IP (Internet Protocol) network, for example.

The control apparatus 120 is configured to include a software management section (SW management section) 121, a key management section 122, and a software update control section (SW update control section) 123.

Figure 5:
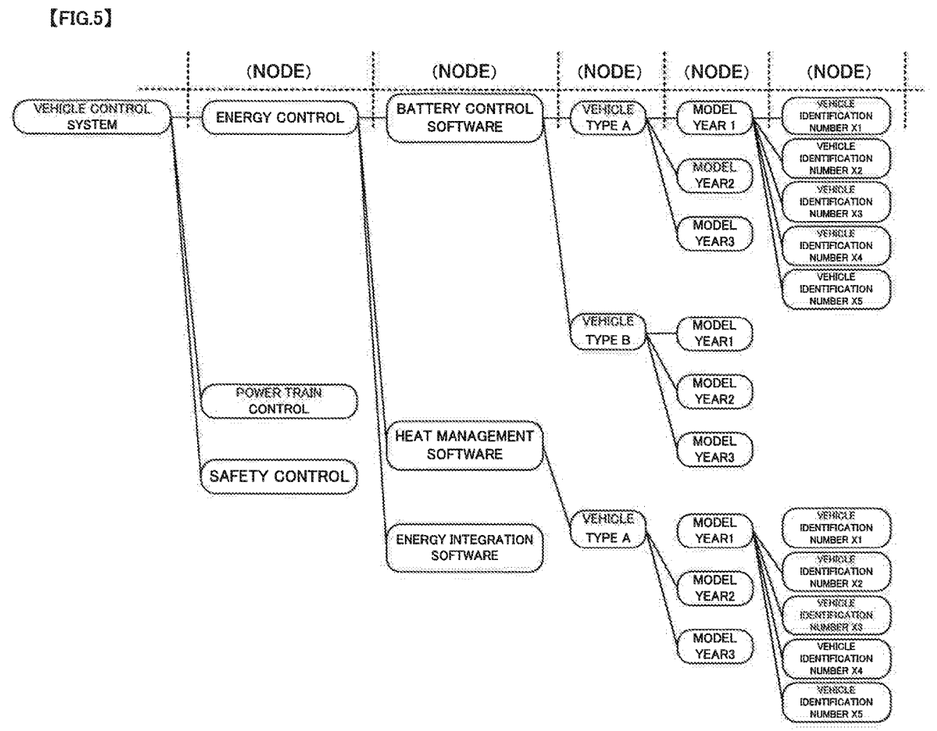
FIG. 5 A diagram showing an example of software management information organized in a Tree structure for a plurality of mobile bodies according to Embodiment 1.

The software update system according to Embodiment 1 delivers, to a plurality of mobile bodies, software for use in control of each of the mobile bodies. FIG. 5 is a diagram showing an example of software management information organized in a Tree structure for a plurality of mobile bodies.

As shown in FIG. 5, by way of example, the vehicle control system is formed of a plurality of control systems, and each of the control systems controls operation of hardware using software. These control systems are shared by different vehicle types or by vehicles of each model year, for example. Alternatively, different control systems may be used in the same vehicle type or the same model year.

Thus, the use of software in control performed by the vehicle control system requires association of software with each of the plurality of control systems and association of software with the vehicle to which the software is applied, thereby extremely complicating the management of the software which is applied to each vehicle. To address this, as shown in FIG. 5, Embodiment 1 treats, as a node, each of the control system, the software used in the control system, the vehicle type to which the software is applied, the model year, and the vehicle identification number, and manages them in groups by connecting and organizing the nodes into a Tree structure.

The SW management section 121 receives input of attributes of each of a plurality of mobile bodies (such as vehicle type, model year, and vehicle identification number) and information related to each software used by the control system in each mobile body and provides a group management function by setting each node and connecting such nodes in the Tree structure as shown in FIG. 5. The software management information of Tree structure is stored in the storage apparatus 130. The SW management section 121 also receives registration of update software for each node in the software management information of Tree structure and stores the update software in the storage apparatus 130 in association with each node.

As the number of mobile bodies requiring software management increases, the control of delivery of software is more complicated. By way of example, from a security point of view, it is necessary to set a different secret key for each mobile body, to encrypt software with such a different secret key for each mobile body, and to deliver the software individually to the target mobile body. In addition, since tens of thousands of, or even hundreds of thousands of vehicles are produced and sold per year, it is unrealistic to assign a unique secret key to each vehicle and manage them. Particularly, in recent years, software sharing among vehicle types or model years has been increasingly performed, and efficient software management is needed as the number of vehicles increases year after year.

Figure 6:
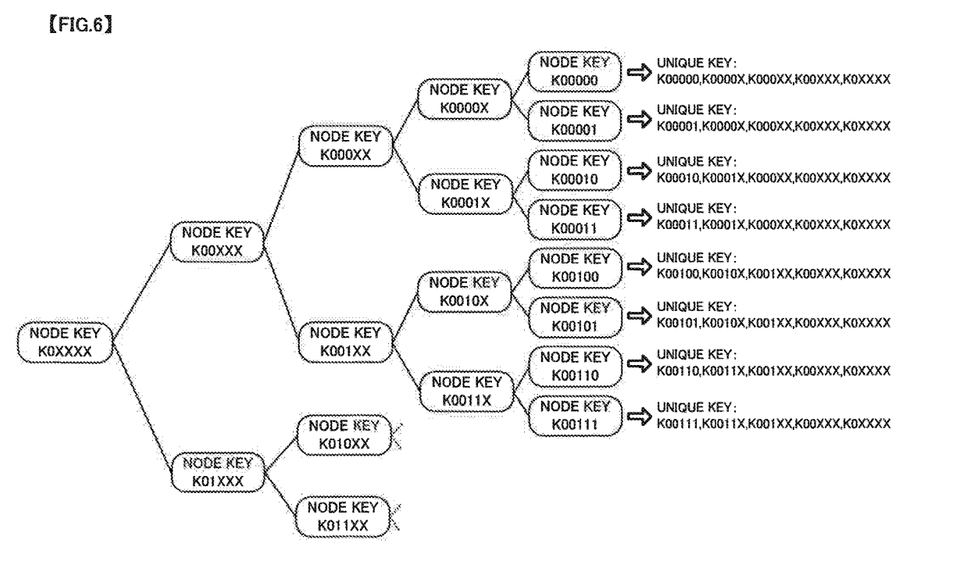
FIG. 6 A diagram for explaining unique keys of mobile bodies based on a group key encryption scheme according to Embodiment 1.

In Embodiment 1, the nodes in the software management information of Tree structure are managed in groups, and a group key encryption scheme is applied such that software to be delivered is encrypted with a common group key and then delivered to each mobile body. FIG. 6 is a diagram for explaining unique keys of mobile bodies based on the group key encryption scheme.

The key management section 122 assigns a node key to each node in the software management information of Tree structure. The node key is an encryption key. For example, referring also to the example of FIG. 5, energy control is managed as a higher node, and battery control software and heat management software are managed as its lower nodes. The higher node is assigned a node key "K0XXXX," and the lower nodes "battery control software" and "heat management software" are assigned node keys "K00XXX" and "K01XXX," respectively.

A plurality of vehicle types corresponding to lower nodes of the node "battery control software" are assigned node keys "K000XX" and "K001XX," and "year models" corresponding to lower nodes of the vehicle type are assigned node keys "K0000X" and "K0001X." The lowest nodes, that is, vehicle identification numbers for uniquely identifying mobile bodies, are assigned node keys "K00000" and "K00001."

As a result, the mobile body has five encryption keys, for example "K00000," "K0000X," "K000XX," "K00XXX," and "K0XXXX." The key management section 122 combines these encryption keys into a unique key for each mobile body and registers and manages the unique key.

Figure 7:
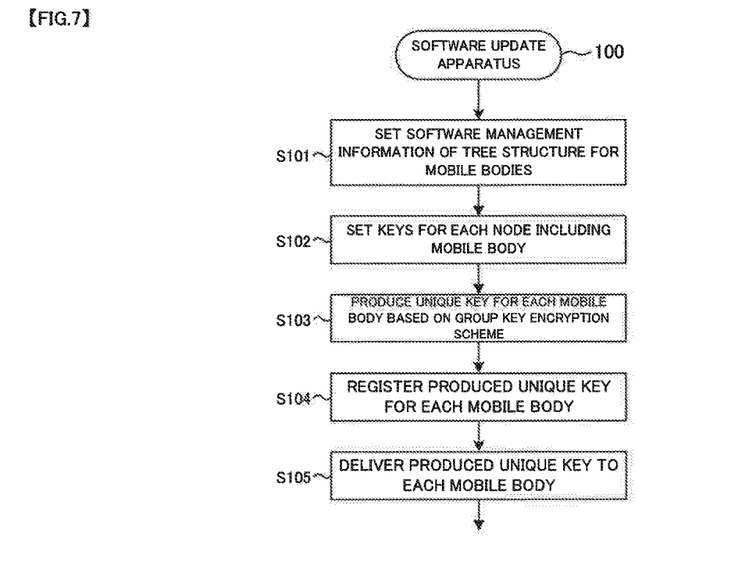
FIG. 7 A flow chart illustrating processing of registering a unique key for each mobile body based on the group key encryption scheme according to Embodiment 1.

FIG. 7 is a flow chart illustrating processing of registering the unique key of a mobile body based on the group key encryption scheme. The SW management section 121 receives input of attributes of a plurality of mobile bodies (such as vehicle type, model year, and vehicle identification number) and information related to each software used by the control system as described above, produces software management information of Tree structure by setting each node and connecting and organizing those nodes into a Tree structure, and stores the software management information in the storage apparatus 130 (S101).

The key management section 122 assigns a node key to each node in the produced software management information of Tree structure (S102), and combines the node keys from the highest node to the lowest node into a unique key for each mobile body (S103). The key management section 122 stores the produced unique key for each mobile body in the storage apparatus 130 (S104) and transmits the unique key for each mobile body registered in the software update apparatus 100 to each mobile body (vehicle-mounted GW apparatus 200) (S105).

Figure 8:
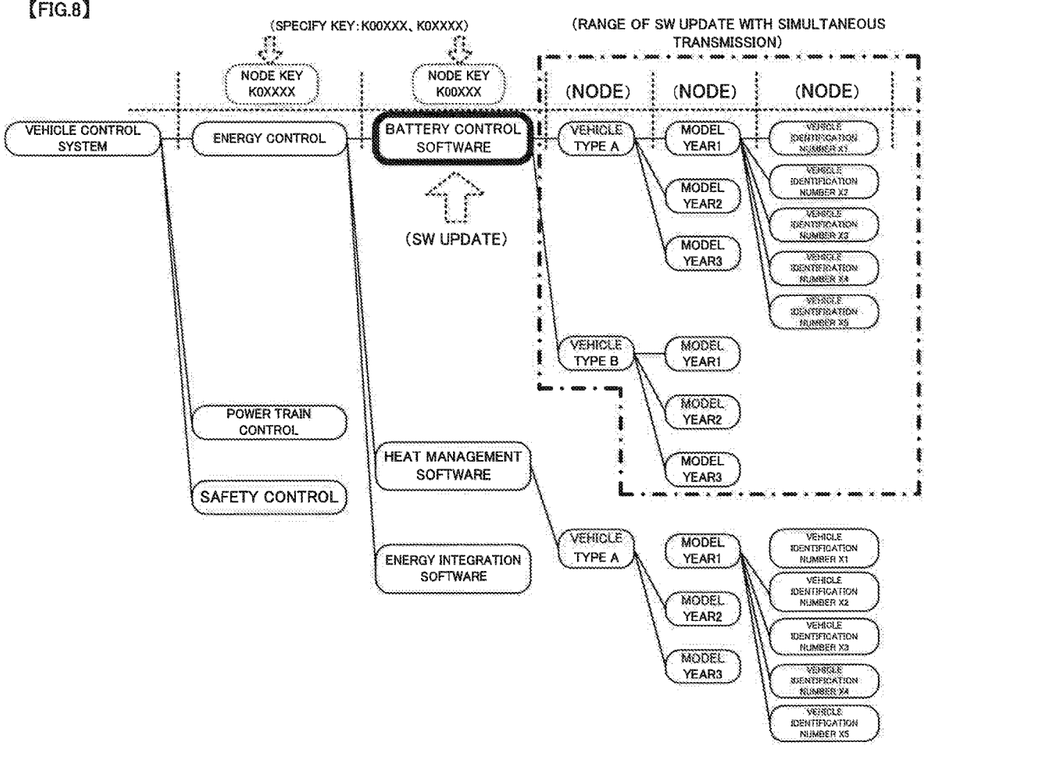
FIG. 8 A diagram for explaining simultaneous update of software with the unique key of the mobile body according to Embodiment 1.

The unique key held in each mobile body is produced by using a plurality of node keys based on the group key encryption scheme and is shared between the software update apparatus 100 and the mobile body. FIG. 8 is a diagram for explaining simultaneous update of software with the unique key according to Embodiment 1. As shown in FIG. 8, for updating "battery control software" by way of example, the SW update control section 123 extracts the node key "K00XXX" of the "battery control software" and the node key "K0XXXX" of the higher node based on the correspondence between the software management information and the node keys. The SW update control section 123 encrypts the software to be delivered with a group key formed through combination of the node key "K00XXX" and the node key "K0XXXX," and delivers the software to each of mobile bodies belonging to the lower nodes of the "battery control software."

Since each mobile body previously holds its node key, the mobile body decodes and deciphers the encrypted software received from the software update apparatus 100 with the group key formed through combination of the node key "K00XXX" and the node key "K0XXXX."

As described above, according to Embodiment 1, in the update of "battery control software," the software can be delivered simultaneously to the plurality of mobile bodies with ensured security, only by specifying the node key "K00XXX" without individually specifying the lower nodes, that is, the mobile bodies.

When the update of "battery control software" is desired only in "vehicle type A," the SW update control section 123 encrypts the software to be delivered with a group key formed through combination of "K000XX," "K00XXX," and "K0XXXX," which includes the additional node key "K000XXX" of the "vehicle type A," based on the correspondence between the software management information and the node keys, and delivers the software to each of mobile bodies belonging to the lower nodes of the "vehicle type A."

Next, a method of updating software according to Embodiment 1 is described with reference to FIG. 9 to FIG. 11. In Embodiment 1, the software update apparatus 100 and the mobile body (vehicle-mounted GW apparatus 200) share log files and perform matching of the files to improve reliability in software delivery to the mobile body.

Figure 9:
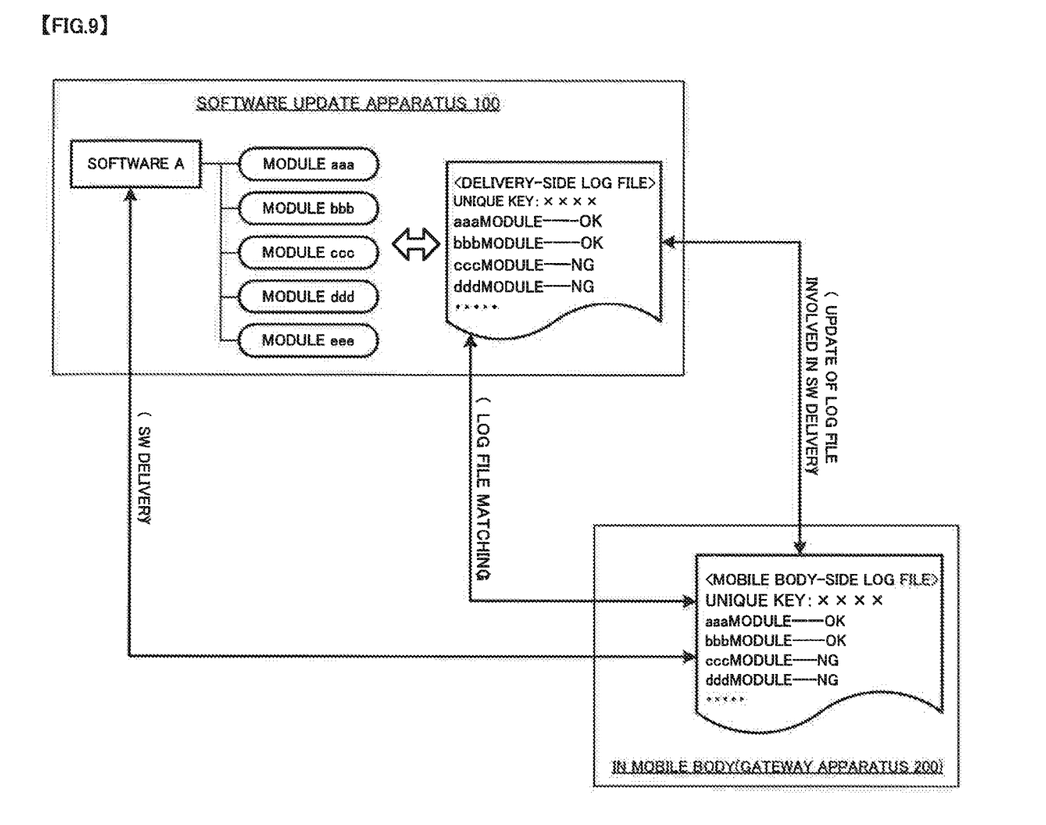
FIG. 9 A diagram for explaining software delivery control using a delivery-side log file and a mobile body-side log file according to Embodiment 1.

FIG. 9 is a diagram for explaining software delivery control using a delivery-side log file and a mobile body-side log file. The delivery-side log file is produced for each software to be delivered, and has a recorded unique key of a mobile body to which software should be delivered (including the node keys of the higher nodes). The delivery-side log file has delivery OK (delivery allowed) or delivery NG (delivery not allowed) recorded thereon for each of a plurality of program modules constituting the software.

The mobile body-side log file has a similar configuration. Specifically, it has a recorded unique key of that mobile body (including the node keys of the higher nodes) and reception OK or NG recorded thereon for each of a plurality of program modules constituting the software. Each of the software update apparatus 100 and the mobile body holds the same log file. A delivery history indicating delivery OK or NG is associated with a reception history indicating reception OK or NG. Delivery NG of the delivery history is not changed into delivery OK simply by delivery of software from the software update apparatus 100, and delivery NG transitions to delivery OK based on the reception history (achievement of reception) on the side of the mobile body.

While Embodiment 1 is described in conjunction with the example in which software is composed of a plurality of program modules, the present invention is not limited thereto and includes an aspect in which software is divided into a plurality of pieces for delivery, for example. In addition, when software is composed of a plurality of program modules, desired ones of the program modules or only one of the program modules may be delivered.

Figure 10:
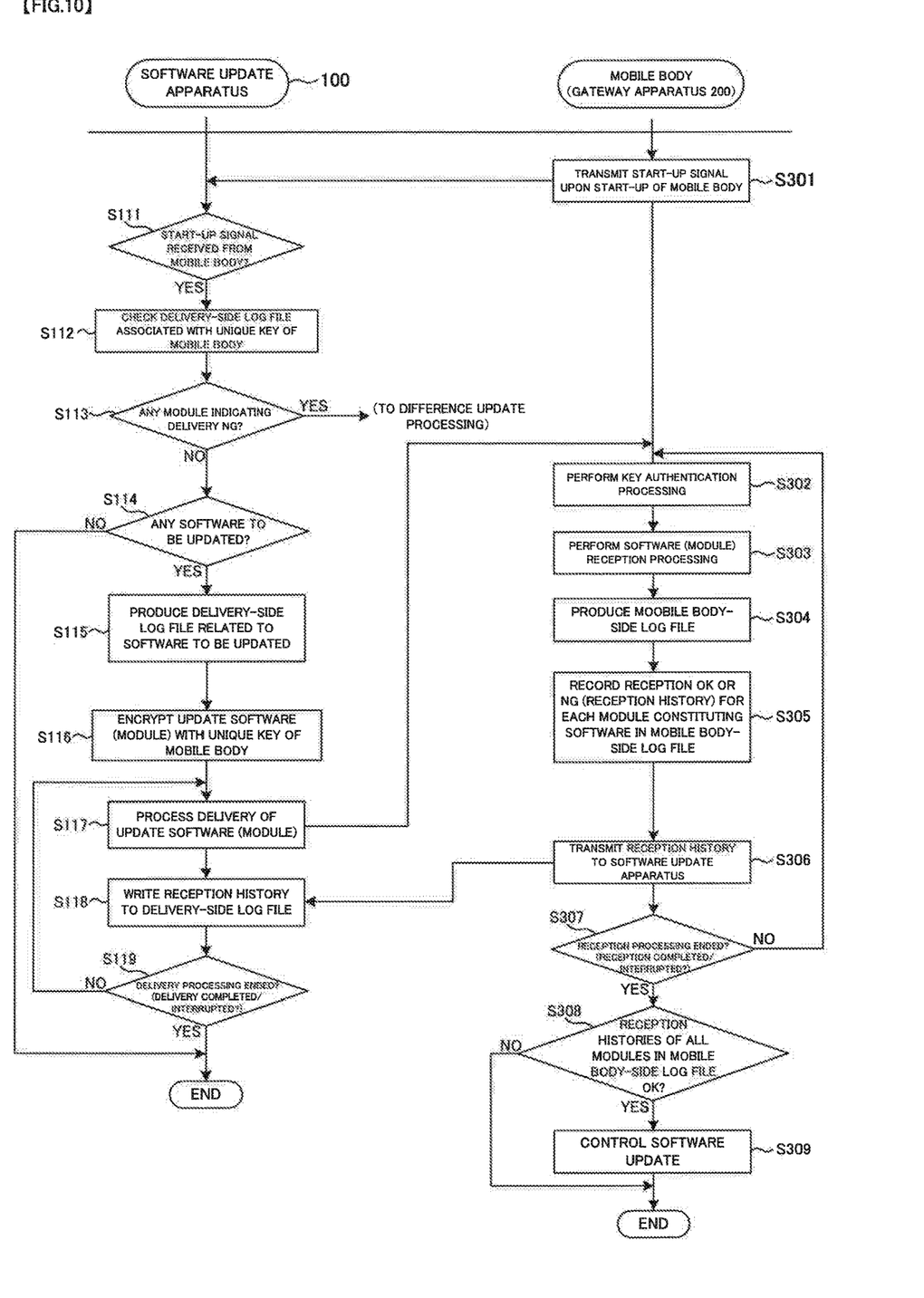
FIG. 10 A flow chart illustrating software update processing performed through the vehicle-mounted gateway apparatus according to Embodiment 1.

FIG. 10 is a flow chart showing software update processing through the vehicle-mounted GW apparatus 200. Upon start-up of a mobile body, for example by turn-on of an ignition switch of the vehicle, the vehicle-mounted GW apparatus 200 transmits a start-up signal to the software update apparatus 100 (S301). Upon reception of the start-up signal from the vehicle-mounted GW apparatus 200 (YES at S111), the software update apparatus 100 checks a delivery-side log file associated with the unique key of the mobile body (S112).

For example, the correspondence between the unique key of the mobile body and the vehicle-mounted GW apparatus 200 can be stored previously in the storage apparatus 130. The SW update control section 123 can identify the mobile body by using the MAC address of the vehicle-mounted GW apparatus 200 or the vehicle identification number included in the start-up signal transmitted from the vehicle-mounted GW apparatus 200 and extract the delivery-side log file related to that mobile body. In other words, the mobile body (vehicle-mounted GW apparatus 200), the delivery-side log file, and the unique key are associated with each other.

The SW update control section 123 refers to the extracted delivery-side log file to check whether any delivery NG is stored in the log file (S112). The delivery-side log file after completion of delivery has all the delivery histories of the program modules indicating delivery OK. When no delivery NG is recorded in the delivery-side log file, it is determined that there is no program module with delivery unpermitted (S113), and then it is determined whether any update software to be updated is registered (S114).

For example, when receiving registration of update software, the SW management section 121 can set an update flag of the update software before delivery as "undelivered." When the SW update control section 123 refers to the update flag to determine that any software to be updated is registered (YES at S114), the SW update control section 123 produces a delivery-side log file related to the software to be updated and stores the produced log file in the storage apparatus 130 (S115).

As shown in FIG. 9, update software information including update software and a group of program modules constituting the software is registered for the update software. The SW update control section 123 refers to the update software information, and can produce a delivery-side log file including a list of a group of program modules of software A to be updated, for example. Each of the program modules has an area set therein for recording delivery OK or NG. A log file of software to be delivered for the first time has "delivery NG" written to all program modules by default.

The update flag of the update software before delivery is set to "undelivered." At the time of production of a delivery-side log file of the update software having the "undelivered" update flag, the update flag changes into "in delivery." At the time when all the delivery histories in the delivery-side log file change into delivery OK in response to the reception history transmitted from the vehicle-mounted GW apparatus 200, the update flag changes into "delivered." The flag control as described above is performed by the SW management section 121 or the SW update control section 123.

The SW update control section 123 produces a group key for the newly registered software based on the correspondence between the software management information and the node keys and encrypts the software to be delivered with the produced key (S116). When the software to be delivered is composed of a plurality of program modules, the SW update control section 123 can individually encrypt the program modules and sequentially deliver those program modules.

The plurality of program modules are delivered in any order, and may be delivered in a predetermined order. After the reception of one program module by the mobile body is confirmed (after the reception of reception OK), the next program module may be delivered. Alternatively, program modules may be delivered sequentially without confirming reception of the program modules by the mobile body. In the latter case, the vehicle-mounted GW apparatus 200 similarly records the reception history of each received program module in a mobile body-side log file and transmits those received histories to the software update apparatus 100.

Next, on the side of the mobile body, the vehicle-mounted GW apparatus 200 receives each of the program modules of the update software. The software update management section 224 of the vehicle-mounted GW apparatus 200 deciphers the encrypted program modules with the unique key stored previously in the storage section 225. In other words, key authentication with the unique key is performed on the side of the mobile body (S302). For example, digital signature according to a public key encryption scheme may be used to authenticate the software update apparatus 100 from which the program modules are transmitted.

The software update management section 224 performs reception processing of storing the program modules deciphered with the unique key in the storage section 225 (S303) and produces a mobile body-side log file (S304). The received program modules may be stored in a predetermined storage area provided in the vehicle control system 300, instead of the storage section 225.

The software update apparatus 100 can deliver the software to be updated, for example including a flag which indicates that the software is new update software. In this case, the software update management section 224 produces a new mobile body-side log file related to the update software as described above. Since the update software and the mobile body-side log file are associated with each other, the software update management section 224 can search already produced mobile body-side log files to determine whether any mobile body-side log file related to the received update software is present. When it is determined that the associated mobile body-side log file is not present, the software update management section 224 can produce a new mobile body-side log file.

For update software which has never been received by the mobile body, the software update apparatus 100 may provide a mobile body-side log file related to that software. Specifically, the software update apparatus 100 produces a delivery-side log file in delivery of the software (a log file having all logs indicating delivery NG) and thus can transmit the log file to the mobile body such that the log file can be used directly as the mobile body-side log file.

The SW update control section 123 can also deliver the update software information referred to when producing the delivery-side log file to the mobile body. In this case, the software update management section 224 can produce a mobile body-side log file in which "delivery NG" is written to all program modules by default, similar to the delivery-side log file, since this is a log file of software delivered for the first time.

The software update management section 224 records reception OK or NG for each received program module in the mobile body-side log file (S305). The software update management section 224 transmits the reception history (reception OK or NG) recorded in the mobile body-side log file to the software update apparatus 100 (S306). The software update apparatus 100 receives the reception history from the vehicle-mounted GW apparatus 200 and records the delivery OK or NG for each corresponding program module in the delivery-side log file (S118). In Embodiment 1, unless the reception history is received from the vehicle-mounted GW apparatus 200, the delivery history in the delivery-side log file does not transition to "delivery OK."

The software update apparatus 100 repeatedly performs steps S117 and S118 until the delivery processing is ended (S119). Similarly, the vehicle-mounted GW apparatus 200 repeatedly performs steps S302 to S306 until the reception processing is ended (S307). The end of the delivery processing and the end of the reception processing include interruption of delivery due to disconnection of the communication channel.

After the reception processing is ended, the software update management section 224 refers to the mobile body-side log file to determine whether all the program modules indicate "reception OK" (S308). The software update management section 224 permits update of the software associated with the mobile body-side log file having all the program modules indicating "reception OK." Specifically, the software update management section 224 outputs the software stored in the storage section 225 to the vehicle control system 300 and outputs a software update instruction (S309). In the vehicle control system 300, for example, a vehicle ECU responsible for overall control of the vehicle performs software update at a predetermined timing or in real time. The result of the software update (update OK or NG) is output from the vehicle control system 300 to the software update management section 224. The software update management section 224 can transmit the result of the software update (update OK or NG) to the software update management apparatus 100.

Figure 11:
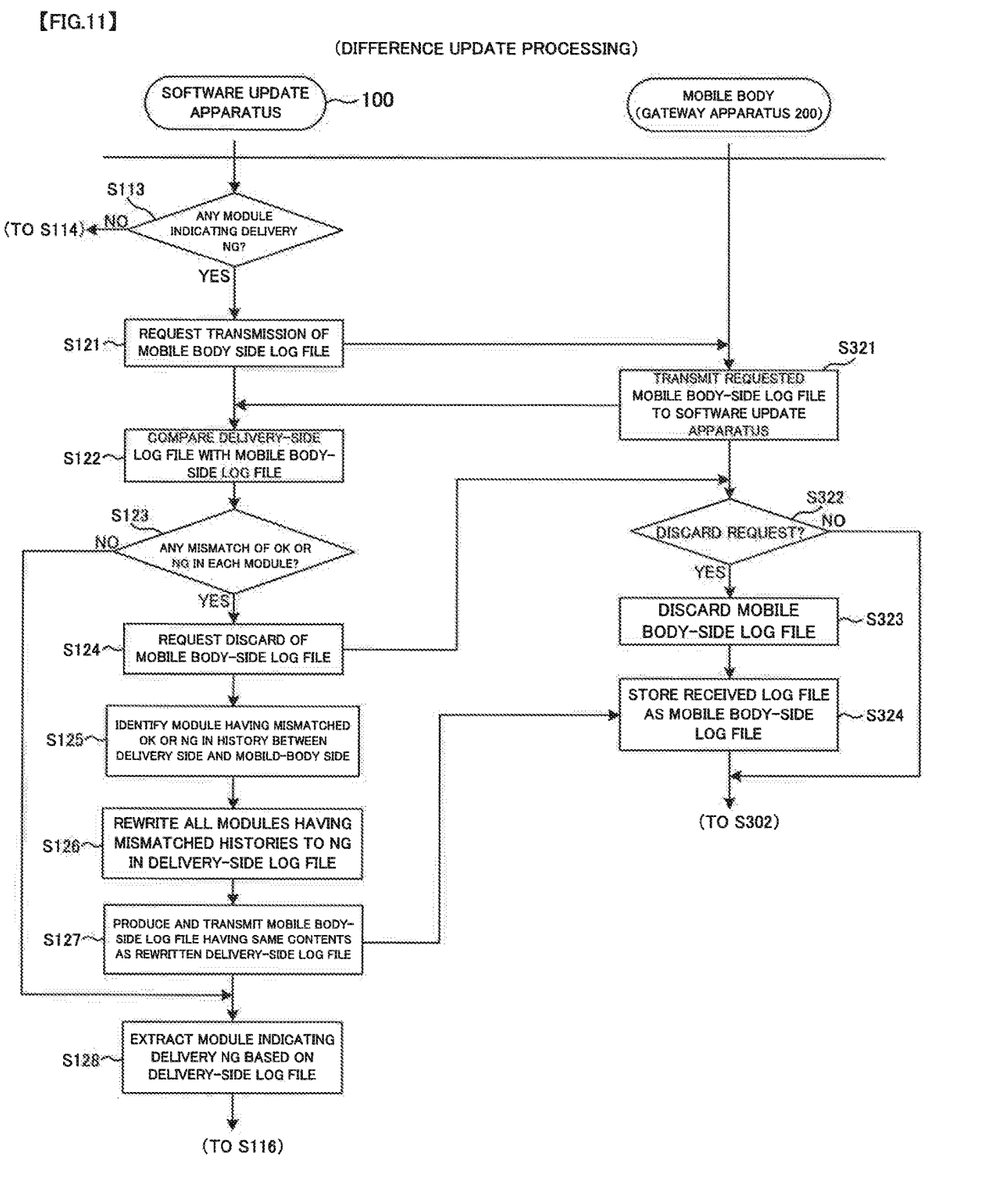
FIG. 11 A flow chart illustrating software update apparatus (difference update processing) performed through the vehicle-mounted gateway apparatus according to Embodiment 1.

FIG. 11 is a flow chart showing software update processing through the vehicle-mounted GW apparatus 200 and is a diagram illustrating difference update processing after delivery of update software is ended in an incomplete state at step S113 in FIG. 10. The delivery incomplete state means that a delivery-side log file is produced and update software is delivered (with its update flag set to "in delivery") but the delivery history in the delivery-side log file includes at least one delivery NG.

The example of FIG. 11 shows difference delivery processing for any program module of update software when it is not clear that whole or part of the program module is received by the mobile body due to disconnection of communication during the delivery of the software or for the reason of data capacity or delivery timing.

When it is determined that any delivery NG is recorded in the already produced delivery-side log file at step 113, the SW update control section 123 outputs, to the vehicle-mounted GW apparatus 200, a request for transmitting a mobile body-side log file to the software update apparatus 100 (S121). The vehicle-mounted GW apparatus 200 transmits the requested mobile body-side log file to the software update apparatus 100 in response to the transmission request (S321).

The SW update control section 123 compares the mobile body-side log file received from the vehicle-mounted GW apparatus 200 with the delivery-side log file to match OK or NG in the delivery history with OK or NG in the reception history for each program module (S122). When there is a mismatch of OK or NG between the delivery history and the reception history in any of the program modules (YES at S123), the SW update control section 123 rewrites the log file.

The SW update control section 123 transmits a request for discarding the mobile body-side log file to the vehicle-mounted GW apparatus 200 (S124). The vehicle-mounted GW apparatus 200 discards (deletes) the saved mobile body-side log file in response to the log file discard request received from the software update apparatus 100 (S323).

The SW update control section 123 identifies, in the delivery history of the delivery-side log file, any program module having mismatched OK or NG between the delivery history and the reception history (S125) and rewrites all those mismatched logs into delivery NG (S126). In addition to the rewriting of the delivery-side log file, the SW update control section 123 produces a mobile body-side log file identical to the delivery-side log file having rewritten contents and transmits the produced log file to the vehicle-mounted GW apparatus 200 (S127). The vehicle-mounted GW apparatus 200 receives the log file having the same contents as the delivery-side log file from the software update apparatus 100 and stores the received log file in the storage section 225 as a mobile body-side log file (S324).

As described above, when any mismatch is present in the log contents between the delivery-side log file and the mobile body-side log file, Embodiment 1 performs control such that both the delivery history in the delivery-side log file and the reception history in the mobile body-side log file associated with the mismatched program module are rewritten to NG and then the program module is retransmitted. For example when the reception history in the mobile body-side log file indicates reception OK but the delivery history in the delivery-side log file indicates delivery NG or when the delivery history in the delivery-side log file indicates delivery OK but the reception history in the mobile body-side log file indicates reception NG, the contents of the log file are once reset (rewritten to NG) and then retransmission is performed.

The configuration as described above can provide the environment where software can be updated without fail. Since the communication environment of the mobile body changes, the communication may be disconnected during operation. Although it is desirable to receive the whole update software by the mobile body, changes in the communication environment may prevent the whole update software (program modules) from being received completely. In this case, whether the reception is completed on the mobile body side cannot be known correctly only from the delivery result managed by the software update apparatus 100 on the delivery side, and some loss may occur in the received update software.

To address this, the software update method according to Embodiment 1 includes managing the delivery history and the reception history on both the delivery-side log file and the mobile body-side log file, and when delivery of the update software is interrupted for any reason, comparing those log files, rewriting the delivery history and the reception history of the program module having mismatched histories to NG to reset those files, and retransmitting them.

The configuration as described above allows the delivery of the update software to the mobile body without fail. The mobile body-side log file is referred to, and only when all the program modules show "reception OK," update of that software is permitted. As a result, the software update can be performed reliably.

At step S123, when it is determined that no mismatch is found in OK or NG between the delivery history and the reception history, the SW update control section 123 refers to the delivery-side log file to extract any program module indicating delivery NG. Then, the software update apparatus 100 performs the processing at step S116 and the following steps by sequentially performing encryption based on the group key, delivery, and log recording of the reception history received from the vehicle-mounted GW apparatus 200. Similarly, the vehicle-mounted GW apparatus 200 performs the processing at step S302 and the following steps by sequentially performing log recording of the reception history and transmission of the log records to the software update apparatus 100. Since the example of FIG. 11 shows the difference update processing, step S304 is omitted. When the retransmitted program modules include any overlap, the software update management section 224 can overwrite and save the file.

While Embodiment 1 has been described, the vehicle-mounted gateway apparatus 200 can be configured as a vehicle-mounted gateway system. For example, the vehicle-mounted gateway system can be configured such that the communication device 210 and the control device 220 can be configured as individual apparatuses and interconnected to each other. The vehicle-mounted gateway system can also be configured such that the respective functional components of the control device 220 can be configured as individual processing apparatuses as appropriate.

Each of the functions of the software update apparatus 100 and the control device 220 of the vehicle-mounted gateway apparatus 200 can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to perform the function of each component.

The program may be recorded on a computer readable recording medium and provided for the vehicle-mounted GW apparatus 200. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium. A program for implementing each component can be provided from the vehicle exterior network to the vehicle-mounted GW apparatus 200 via the communication device 210 and installed.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 SOFTWARE UPDATE APPARATUS
110 COMMUNICATION APPARATUS
120 CONTROL APPARATUS
121 SOFTWARE MANAGEMENT SECTION (SW MANAGEMENT SECTION)
122 KEY MANAGEMENT SECTION
123 SOFTWARE UPDATE CONTROL SECTION (SW UPDATE CONTROL SECTION)
200 VEHICLE-MOUNTED GATEWAY APPARATUS (VEHICLE-MOUNTED GW APPARATUS)
210 COMMUNICATION DEVICE
211 VEHICLE INTERIOR COMMUNICATION INTERFACE
212 VEHICLE EXTERIOR COMMUNICATION INTERFACE
220 CONTROL DEVICE
221 VEHICLE INTERIOR COMMUNICATION CONTROL SECTION
222 VEHICLE EXTERIOR COMMUNICATION CONTROL SECTION
223 GATEWAY CONTROL SECTION (GW CONTROL SECTION)
223A NETWORK CONTROL SECTION
2231 ROUTING CONTROL SECTION

2232 PROTOCOL CONVERSION SECTION
2233 SECURITY SECTION
223B COMMUNICATION CONTROL SECTION
2234 COMMUNICATION STATE MONITORING SECTION
2235 COMMUNICATION CHANNEL SELECTION SECTION
2236 MONITORING CONTROL SECTION
2237 CONFIGURATION SETTING CONTROL SECTION
224 SOFTWARE UPDATE MANAGEMENT SECTION
225 STORAGE SECTION
300 VEHICLE CONTROL SYSTEM

The invention claimed is:

1. A software update system for updating at least one piece of software executed on a predetermined system for controlling at least one mobile body, comprising:
a vehicle-mounted gateway apparatus provided within the mobile body and connected to the predetermined system, and a software update apparatus connected to the vehicle-mounted gateway apparatus through a network,
wherein the software update apparatus includes:
a first storage section storing delivery-side log information related to software to be delivered to the vehicle-mounted gateway apparatus; and
a software update control section configured to perform delivery control for delivering the software to the vehicle-mounted gateway apparatus, to receive reception OK or reception NG of the software from the vehicle-mounted gateway apparatus, and to record the reception OK or the reception NG in the delivery-side log information,
the vehicle-mounted gateway apparatus includes:
a second storage section storing mobile body-side log information associated with the delivery-side log information, the reception OK or the reception NG of the software delivered from the software update apparatus being recorded in the mobile body-side log information; and
a software update management section configured to record the reception OK or the reception NG in the mobile body-side log information based on a reception result of the software and to transmit the reception OK or the reception NG on the side of the mobile body to the software update apparatus, and
the software update management section is configured to refer to the mobile body-side log information and to permit update of the software on the predetermined system when a reception history of the software indicates the reception OK,
wherein the software is composed of a plurality of program modules,
the software update control section is configured to deliver each of the plurality of program modules to the vehicle-mounted gateway apparatus, to receive the reception OK or the reception NG of each of the plurality of program modules from the vehicle-mounted gateway apparatus, and to record the reception OK or the reception NG in the delivery-side log information,
the software update management section is configured to:
record the reception OK or the reception NG of each of the plurality of program modules delivered from the software update apparatus in the mobile body-side log information, and
refer to the mobile body-side log information and permit update of the software on the predetermined system when reception histories of all the plurality of program modules constituting the software indicate the reception OK,
wherein the software update control section is configured to:
compare the mobile body-side log information transmitted from the vehicle-mounted gateway apparatus with the delivery-side log information to determine whether a mismatch is present in the reception OK or the reception NG of log information of at least one of the program modules,
when it is determined that a mismatch is present, perform update by rewriting the log information of the program module determined as the mismatch in the delivery-side log information into the reception NG and control the vehicle-mounted gateway apparatus to update the log information of the program module determined as the mismatch in the mobile body-side log information into the reception NG, and
deliver the program module having the log information of the reception NG to the vehicle-mounted gateway apparatus based on the updated delivery-side log information.

2. The software update system according to claim 1, wherein the software update control section is configured to:
refer to the delivery-side log information of the software to determine whether log information of at least one of the program modules indicates the reception NG, and when it is determined that log information of at least one of the program modules indicates the reception NG, transmit a transmission request, to the vehicle-mounted gateway apparatus, for transmitting the mobile body-side log information to the software update apparatus,
compare the mobile body-side log information transmitted from the vehicle-mounted gateway apparatus with the delivery-side log information and, when it is determined that a mismatch is present in the reception OK or the reception NG of log information of at least one of the program modules, transmit a discard request for discarding the mobile body-side log information to the vehicle-mounted gateway apparatus, and
produce the mobile body-side log information having contents synchronized with the delivery-side log information updated by rewriting the log information of the program module determined as the mismatch into the reception NG and transmit the produced mobile body-side log information to the vehicle-mounted gateway apparatus.

3. The software update system according to claim 1, wherein the first storage section stores software management information including, as nodes, the plurality of pieces of software executed on the predetermined system, attributes for classifying the plurality of mobile bodies to which the software is applied, and the plurality of mobile bodies, the nodes being connected and organized in a Tree structure,
the software update apparatus further includes a key management section configured to assign a node key to each of the nodes in the software management information and to combine the node keys from the highest node to the lowest node into a unique key for each mobile body, the unique key being shared between the software update apparatus and the mobile body, and
the software update control section is configured to encrypt the software with the node key of the software to be delivered to the plurality of mobile bodies and to deliver the encrypted software to the vehicle-mounted gateway apparatus.

4. A software update system for updating at least one piece of software executed on a predetermined system for controlling at least one mobile body, comprising:
a vehicle-mounted gateway apparatus provided within the mobile body and connected to the predetermined system, and a software update apparatus connected to the vehicle-mounted gateway apparatus through a network,
wherein the software update apparatus includes:
a first storage section storing delivery-side log information related to software to be delivered to the vehicle-mounted gateway apparatus; and
a software update control section configured to perform delivery control for delivering the software to the vehicle-mounted gateway apparatus, to receive reception OK or reception NG of the software from the vehicle-mounted gateway apparatus, and to record the reception OK or the reception NG in the delivery-side log information,
the vehicle-mounted gateway apparatus includes:
a second storage section storing mobile body-side log information associated with the delivery-side log information, the reception OK or the reception NG of the software delivered from the software update apparatus being recorded in the mobile body-side log information; and
a software update management section configured to record the reception OK or the reception NG in the mobile body-side log information based on a reception result of the software and to transmit the reception OK or the reception NG on the side of the mobile body to the software update apparatus, and
the software update management section is configured to refer to the mobile body-side log information and to permit update of the software on the predetermined system when a reception history of the software indicates the reception OK,
wherein the first storage section stores software management information including, as nodes, the plurality of pieces of software executed on the predetermined system, attributes for classifying the plurality of mobile bodies to which the software is applied, and the plurality of mobile bodies, the nodes being connected and organized in a Tree structure,
the software update apparatus further includes a key management section configured to assign a node key to each of the nodes in the software management information and to combine the node keys from the highest node to the lowest node into a unique key for each mobile body, the unique key being shared between the software update apparatus and the mobile body, and
the software update control section is configured to encrypt the software with the node key of the software to be delivered to the plurality of mobile bodies and to deliver the encrypted software to the vehicle-mounted gateway apparatus.

5. The software update system according to claim 4, wherein the software is composed of a plurality of program modules,
the software update control section is configured to deliver each of the plurality of program modules to the vehicle-mounted gateway apparatus, to receive the reception OK or the reception NG of each of the plurality of program modules from the vehicle-mounted gateway apparatus, and to record the reception OK or the reception NG in the delivery-side log information,
the software update management section is configured to:
record the reception OK or the reception NG of each of the plurality of program modules delivered from the software update apparatus in the mobile body-side log information, and
refer to the mobile body-side log information and permit update of the software on the predetermined system when reception histories of all the plurality of program modules constituting the software indicate the reception OK.

* * * * *